United States Patent
Gerhardt et al.

[11] Patent Number: 6,162,011
[45] Date of Patent: Dec. 19, 2000

[54] METHOD AND APPARATUS FOR STABILIZING AN INTAKE AIR FLOW OF A GROUND-BASED TURBINE ENGINE

[75] Inventors: Hans-Joachim Gerhardt; Oliver Krueger, both of Aachen; Horst Meessen, Buxtehude; Jean-B. Estadieu, Boetersheim, all of Germany

[73] Assignee: DaimlerChrysler Aerospace Airbus GmbH, Hamburg, Germany

[21] Appl. No.: 09/165,793

[22] Filed: Oct. 2, 1998

[30] Foreign Application Priority Data

Oct. 2, 1997 [DE] Germany .......................... 197 43 591

[51] Int. Cl.⁷ ................................................... B64C 21/08
[52] U.S. Cl. ................. 415/1; 415/119; 415/914; 73/117.4
[58] Field of Search ............................... 415/119, 1, 914, 415/213.1, 116, 117, 208.1; 73/117.4, 117.1

[56] References Cited

U.S. PATENT DOCUMENTS

| | | | |
|---|---|---|---|
| 3,698,509 | 10/1972 | Fitting et al. | 415/119 |
| 4,258,823 | 3/1981 | Ganz et al. | 181/214 |
| 5,377,534 | 1/1995 | Boet . | |
| 5,591,904 | 1/1997 | Schafhaupt et al. | 73/117.4 |

FOREIGN PATENT DOCUMENTS 0649788  4/1995  European Pat. Off. .

*Primary Examiner*—Edward K. Look
*Assistant Examiner*—Richard Woo
*Attorney, Agent, or Firm*—W. F. Fasse; W. G. Fasse

[57] ABSTRACT

When a turbine engine is operated near the ground, for example on a stationary static test stand, the ground effect as well as excessive lateral wind effects can lead to instabilities and unacceptable flow conditions of the air flow entering the air intake of the engine. A method for stabilizing or preventing such instabilities in the engine intake air flow involves preventing the generation or full development of a spiral vortex extending between the ground and the engine air intake. Specifically, by positively introducing air into the vortex core of any spiral vortex being formed, the vortex is destroyed and full development of the vortex is prevented. An apparatus for carrying out the method includes an air permeable element arranged between the ground and the engine air intake, such that a flow of air is provided through the air permeable element into the core of any spiral vortex being formed on the surface of the air permeable element.

17 Claims, 4 Drawing Sheets

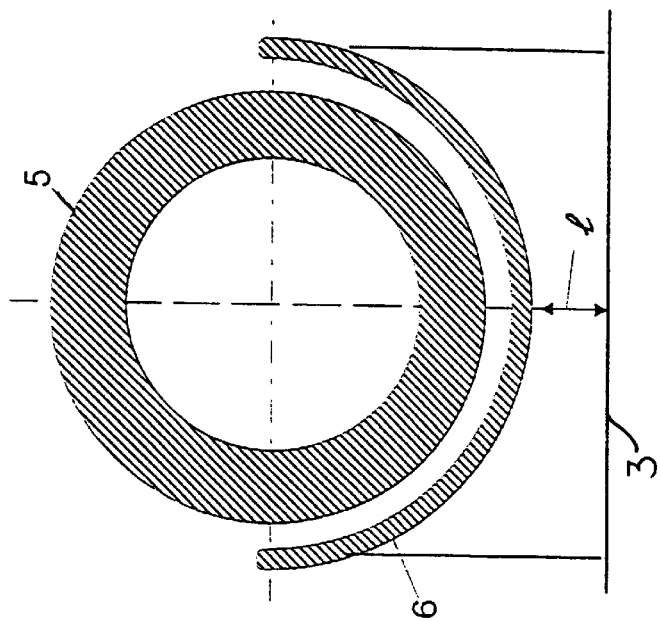
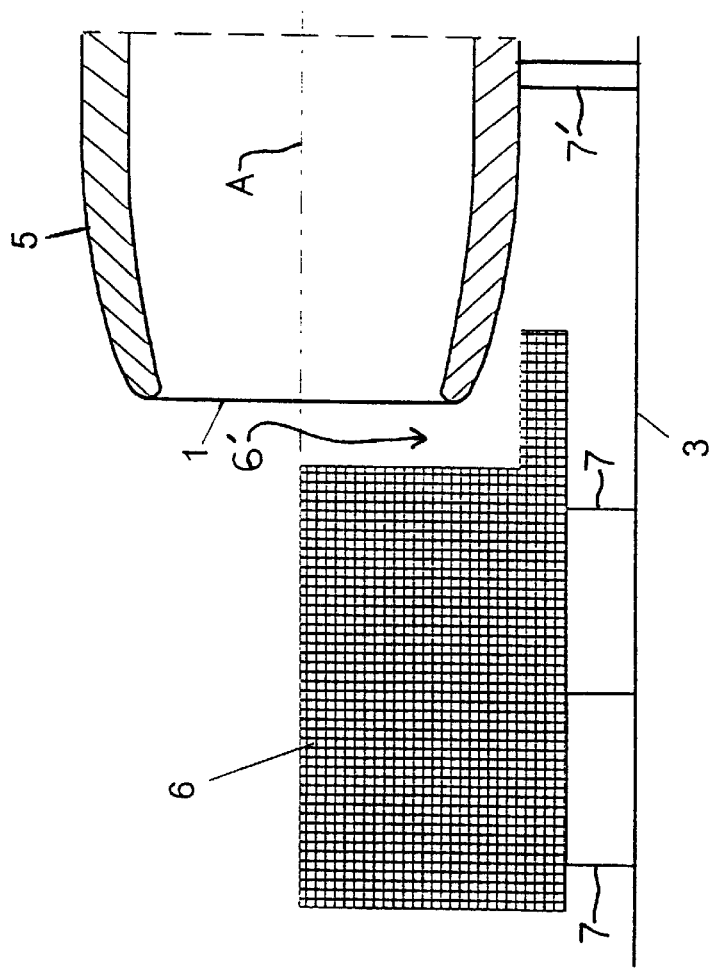
FIG. 2A
FIG. 2B

METHOD AND APPARATUS FOR STABILIZING AN INTAKE AIR FLOW OF A GROUND-BASED TURBINE ENGINE

PRIORITY CLAIM

This application is based on and claims the priority under 35 U.S.C. §119 of German Patent Application 197 43 591.2, filed on Oct. 2, 1997, the entire disclosure of which is incorporated herein by reference.

FIELD OF THE INVENTION

The invention relates to a method and an apparatus for stabilizing an intake air flow of a ground-based turbine engine, such as a turbine engine mounted on a testing stand for carrying out a static test, wherein the ground effect as well as excessive lateral wind effects can lead to unacceptable air flow conditions that are to be prevented.

BACKGROUND INFORMATION

During flight operation, a turbine engine of an aircraft can be represented with regard to a flow analysis, to a good approximation, as a point sink that sucks in air. In this context, it is possible to achieve a nearly constant flow velocity over the entire surface area of the intake cross-section by appropriately forming or configuring the intake contours. Such a constant axial flow velocity over the entire cross-sectional intake area is necessary in order to provide an optimal air flow to all of the blades of the compressor stages of the engine, and particularly to avoid flow separations. In the event that external influences disturb the flow velocity profile in the engine intake, then an optimal air flow will no longer be provided to the blades of the first compressor stage in the area in which the flow velocity profile has been deformed or disturbed. If, as a consequence, the apparent free stream velocity of the air flow relative to the blades in this area varies beyond an acceptable limit, then at least partial flow separations will arise at these areas, and can lead to complete blockage of individual blade channels and can possibly also lead to unacceptable vibrations of the individual blades.

While essentially only lateral wind gusts and the like will have the above described negative influences on the operation of the turbine engine of an aircraft during flight, additional negative influences will have further effects on a turbine engine that is ground-based, i.e. operating on or near the ground. Such additional influences that can lead to unacceptable flow conditions include the ground effect for any turbine engine operating near the ground, excessive lateral wind effects such as near-ground wind gusts and the like, and the air flow disturbing effects of any stand or supporting arrangement that supports the ground-based turbine engine. Throughout this specification, the term "ground" is intended to mean any non-air-permeable surface that is stationarily fixed to the earth, such as tarmac, turf, soil, concrete, steel decking, wood decking, any testing facility floor and the like. Also, terms like "ground-based" and "near the ground" mean close enough to the ground that a ground effect will have an influence on the air flow into the air intake.

These other influences can take effect in the turbine engines of aircraft when the aircraft are operating on the ground, either stationary or taxiing. Moreover, these other influences can be effective on the turbine engines of ground-based vehicles such as tanks and other military vehicles, boats, and land-based vehicles powered by turbine engines. Most significantly, these other influences are effective on stationary ground-based turbine engines, including permanently installed stationary engines of a power plant or the like, and turbine engines that are temporarily stationarily arranged in a test stand for conducting a static test of the respective engine. In this latter case, the test stand itself may induce oscillations or variations of the air flow field due to non-stationary separations of the air flow along the edges or rims of the test stand itself.

FIG. 1 shows a conventional or prior art arrangement of a turbine engine 5 operating in a stationary arrangement relative to the ground 3. FIG. 1 particularly represents the case of a turbine engine mounted on a test stand for carrying out a static test, but also applies to any situation in which the turbine engine is operating, especially in a stationary manner, near the ground. FIG. 1 especially shows the ground effect that generates a spiral vortex 2 with a vortex core 4, which is formed on the ground 3 a small distance in front of the air intake 1 of the engine 5, and which extends up to and enters into the intake 1 at the bottom portion thereof.

The underlying cause of the generation of such spiral vortices 2 is the superposition of a rotationally symmetrical sink flow with a rotational air flow that disturbs or interferes with that sink flow. In the case of the air flow into the engine intake 1, the symmetry of the sink flow being sucked into the intake 1 is interrupted and disturbed by the ground 3. As a result, the air flow in the vicinity of the ground 3 tends to have a rotational impulse or momentum imparted thereto. If the air particles in the vicinity of the ground 3 have even a slight rotational momentum imparted thereto, this rotational momentum will become ever stronger as the respective air particle approaches closer to the engine intake 1. As a result, the angular velocity of the air particles in the region of the spiral vortex 2 becomes very large, and thus stabilizes and perpetuates the vortex system.

If a highly turbulent wind flow is further superimposed on the above described flow system formed by the superposition of the sink flow and the spiral vortex flow, then very great flow instabilities can be formed in the region of the spiral vortex. This results in an irregular alternating sequence of collapse and reformation of the vortex 2. In other words, while the spiral vortex 2 either can be formed or cannot be formed, without variation, under conditions of a uniform, constant, turbulence-free lateral wind impingement, on the other hand, the turbulence in the natural atmospheric wind flow will result in momentary collapse of the vortex 2 and then re-forming of the vortex 2. Thus, the interaction of the ground effect with the turbulent atmospheric wind flow is the predominant basic cause for the observed instability of the intake air flow of turbine engines during static tests and other ground-based operation. Moreover, this natural instability of the air flow can even be increased or amplified because the structural configuration of the test stand for conducting the static test can cause varying and non-stationary separations of the wind flow along the edges or rims of the test stand and associated equipment.

The above described instabilities of the engine intake air flow of turbine engines mounted on static test stands, especially under the influence of lateral wind gusts and the like, are known in the art and have already been noted to cause critical operating situations of turbine engines being tested in various static test stand arrangements. These critical situations have even led to so-called engine stalls. After the occurrence of an engine stall, i.e. an air flow condition resulting in an aerodynamic stall of rotor blades of the engine, it is necessary to dismount and disassemble the engine and carry out an extensive, very expensive inspection for damage.

In order to avoid such instabilities and the resulting unacceptable operating conditions, it has been long and widely attempted in the art to smooth out and uniformalize the wind flow into the intake or inlet opening to the test stand arrangement. A known measure in this context is, for example, the arrangement of deflector vanes in the inlet or intake area of the test stand arrangement. However, it is also known in the art that such measures have previously been unable to achieve a satisfactory solution of the above described problems.

SUMMARY OF THE INVENTION

In view of the above, it is an object of the invention to provide a method by means of which the above described instabilities of the engine intake air flow of a ground-based turbine engine, and particularly a stationary engine operating in a static test stand, can be avoided. It is a further object of the invention to provide a particular test stand structure and configuration that avoids or minimizes the above discussed air flow instabilities. The invention further aims to overcome or avoid the disadvantages of the prior art, and to achieve additional advantages, as apparent from the present description.

The above objects have been achieved in a method for stabilizing the engine intake air flow of a ground-based turbine engine, wherein the ground effect as well as an excessive lateral wind effect can lead to unacceptable flow conditions. According to the invention, the method solves the basic cause of the problem, namely the method involves preventing the generation of a fully formed spiral vortex extending between the ground and the engine intake. In a particular embodiment of carrying out the method, the invention provides a flow of air into the core of the spiral vortex being generated near the ground, and thereby destroys the vortex before it can reach or extend to the engine air intake.

The above objects have further been achieved in an apparatus for stabilizing the intake air flow of a turbine engine, according to the invention, comprising an air permeable element arranged between the ground and the engine in front of or ahead of the engine air intake. The air permeable element is particularly arranged so as to enable the inflow of air through the air permeable element into the core of the spiral vortex being generated, and also ensures a sufficient after-flow for the duration of a static test of the engine carried out on a test stand.

According to particular embodiment details, the air permeable element has a relatively thin surfacially extending configuration, i.e. it is significantly longer and wider than it is thick. For example, the air permeable element has a half-cylindrical shell configuration that partially surrounds the engine and extends and protrudes axially over and beyond the engine air intake. Moreover, the air permeable element preferably cooperates with an air chamber, and a powered ventilator conveys air into the air chamber which is then positively caused to flow through the air permeable element into the core of the spiral vortex.

An essential advantage achieved by the invention is that the generation or especially the propagation of any spiral vortex is reliably prevented. In this manner, the above described air flow instabilities caused by a superposition of a spiral vortex with other influences can be prevented. The method according to the invention is based on ensuring that an air flow will be provided to the core of any arising spiral vortex, in direct contrast to the above described conventional situation in which an increase of the rotational momentum of the air particles in the flow field of the spiral vortex will result in a considerable pressure reduction according to the well known Bernoulli principle, and in which the non-air-permeable ground 3 arranged near the air intake prevents an after-flow or suction-flow of air into the core 4 of the spiral vortex 2 as shown in FIG. 1. By providing air into the core 4 of the spiral vortex 2 according to the invention, the air pressure in the vortex core 4 is advantageously increased, and thereby the rotational momentum of the air particles is reduced and the strength of the vortex flow is reduced and dissipated. By ensuring that a sufficient after-flow of air is provided into the vortex core directly at the site of initial generation of a vortex, the complete generation of a fully developed spiral vortex can be completely prevented.

BRIEF DESCRIPTION OF THE DRAWINGS

In order that the invention may be clearly understood, it will now be described in connection with example embodiments, with reference to the accompanying drawings, wherein:

FIG. 2A is a schematic sectional side view of a turbine engine mounted in a static test stand equipped with an air permeable element according to the invention;

FIG. 2B is a front view of the arrangement shown in FIG. 2A, as seen from the left in FIG. 2A;

DETAILED DESCRIPTION OF PREFERRED EXAMPLE EMBODIMENTS AND OF THE BEST MODE OF THE INVENTION

Figure 1:
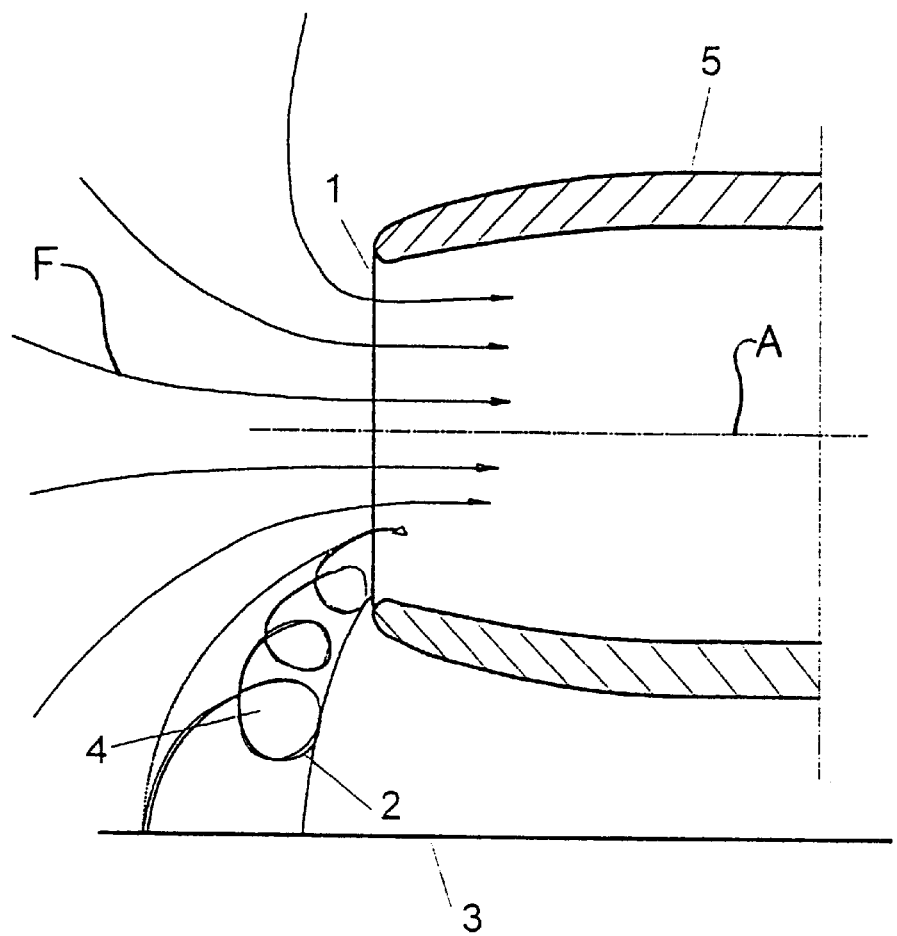
FIG. 1 is a schematic sectional side view illustrating the conventional case of the ground effect and vortex generation at a turbine engine air intake mounted in a static test stand.

FIG. 1 shows a conventional arrangement of a turbine engine 5 near the non-air-permeable ground 3, whereby the ground effect results in the generation of a fully formed spiral vortex 2 having a vortex core 4, that is generated at or near the ground 3 and extends from the ground 3 into the air intake 1 of the engine 5. The problems associated with such vortex generation have been discussed above.

As shown in FIGS. 2A and 2B, the invention provides for an air permeable element 6 arranged between the ground 3 and the engine 5, extending axially in front of the air intake 1 of the engine 5, in such a manner so as to provide and ensure an inflow of air through the air permeable element 6 into the core 4 of any spiral vortex 2 being generated, as well as a sufficient after-flow of air for the duration of a static test of the engine 5. The engine 5 is supported relative to the ground 3 by any support elements 7' that may comprise any known test stand or the like.

The air permeable element 6 in this example embodiment is configured in the shape of a half-cylindrical shell as can be seen especially in FIG. 2B, and is arranged so that it partially surrounds the engine 5 and extends axially or longitudinally parallel to the axis A of the engine 5 over the engine air intake 1. In other words, the air permeable element 6 extends across the plane of the air intake 1 that is perpendicular to the axis A. The air permeable element 6 shape may be characterized by a cut-out area 6' at side portions that would overlap the sides of the engine 5 as seen in FIG. 2A. The air permeable element 6 is supported on support elements 7, such as simple legs or brackets, relative to the ground 3, with a spacing between the ground 3 and the air permeable element 6, and with a radial annular spacing between the element 6 and the engine 5. As an alternative to the support legs 7, the element 6 may be supported relative to the test stand or even relative to a mobile support (such as a vehicle) on which the engine 5 is supported, so long as the relationship between the element 6 and the engine 5 is maintained fixed.

With the present arrangement of FIGS. 2A and 2B, the air permeable element 6 interrupts the path between the ground 3 and the air intake 1 and thus prevents the generation of a spiral vortex on the ground 3. Moreover, if a spiral vortex is generated or begins to form on the air permeable element 6 itself, at a location in front of the engine air intake 1, an after-flow of air will be enabled to flow into the vortex core 4 of the vortex due to the air permeability of the surface 6A of the element 6. In this manner, the air pressure in the vortex core 4 is increased, the rotational momentum of the air particles is thereby reduced, and the strength of the vortex is diminished. By appropriately designing the air flow characteristics of the air permeable element 6, it can be ensured that a sufficient after-flow is provided into the vortex core to completely destroy the vortex as it is being generated and before it extends completely up to the air intake 1 of the engine 5.

While the air permeable element 6 shown in FIGS. 2A and 2B has a half-cylindrical shell configuration, it should be understood that the element 6 could instead be provided as a flat planar element, for example as will be described below in connection with FIG. 4.

Figure 3:
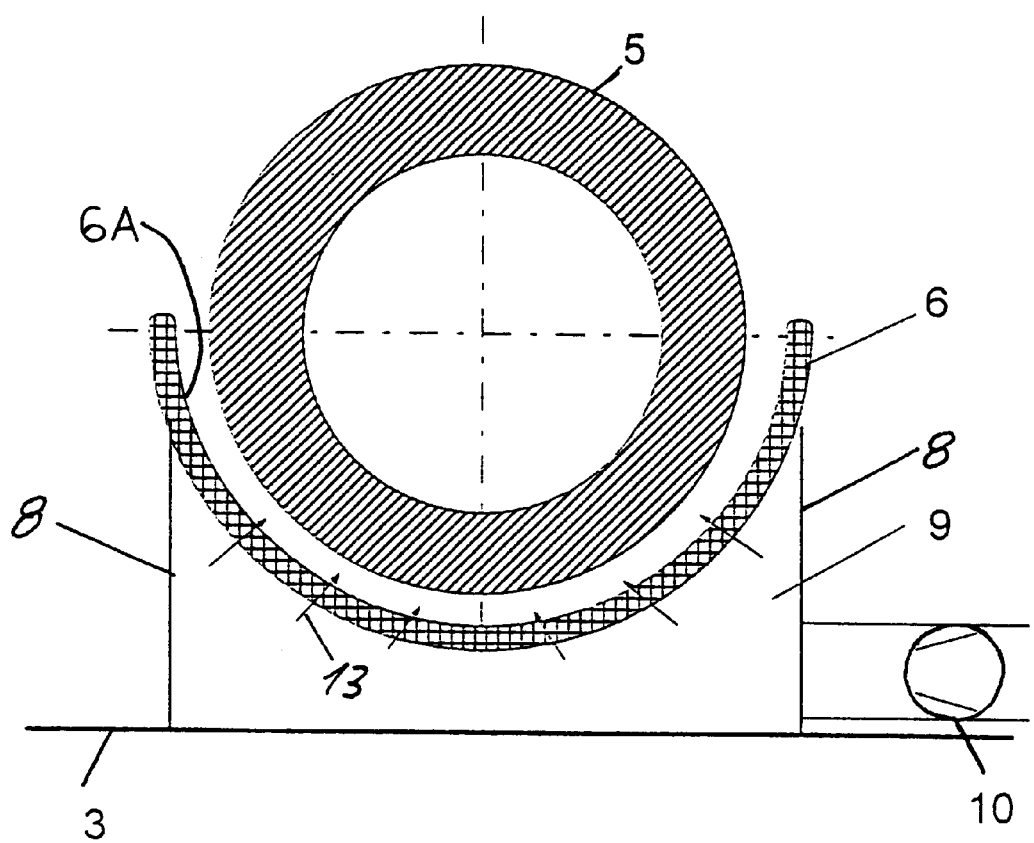
FIG. 3 is a view similar to that of FIG. 2B showing a test stand arrangement including an air permeable element and an air chamber as seen in a front view.

FIG. 3 shows an arrangement similar to that of FIGS. 2A and 2B, except that solid chamber walls 8 enclose the space between the air permeable element 6 and the ground 3 so as to form an air chamber 9 therein. The chamber walls 8 may also serve to support the air permeable element 6 relative to the ground 3, whereby the supporting elements or legs 7 shown in FIGS. 2A and 2B may be omitted. A power driven ventilator 10 such as a fan or blower is connected by a suitable duct or the like to the air chamber 9, so as to positively deliver air into the air chamber 9. The positively introduced air flow and a positive pressure generated thereby in the air chamber 9, as well as a suction effect above the air permeable element 6 causes an emanating air flow 13 to flow through the air permeable element 6. In this manner, any spiral vortex being generated on the air permeable surface 6A of the air permeable element 6 will have an air flow, namely the emanating air flow 13, positively blown into the vortex core.

The resulting reduction of the vortex strength may thus be improved and amplified by positively blowing an air flow 13 through the air permeable surface 6. Preferably, the ventilator 10 is adjustable or controllable, so that the proper air flow, with the proper flow volume, velocity and pressure is caused to flow through the air permeable element 6 under any particular operating condition and parameters of the engine 5 undergoing a static test, to ensure that vortex generation is eliminated or any vortices being initially generated are quickly destroyed.

Figure 4:
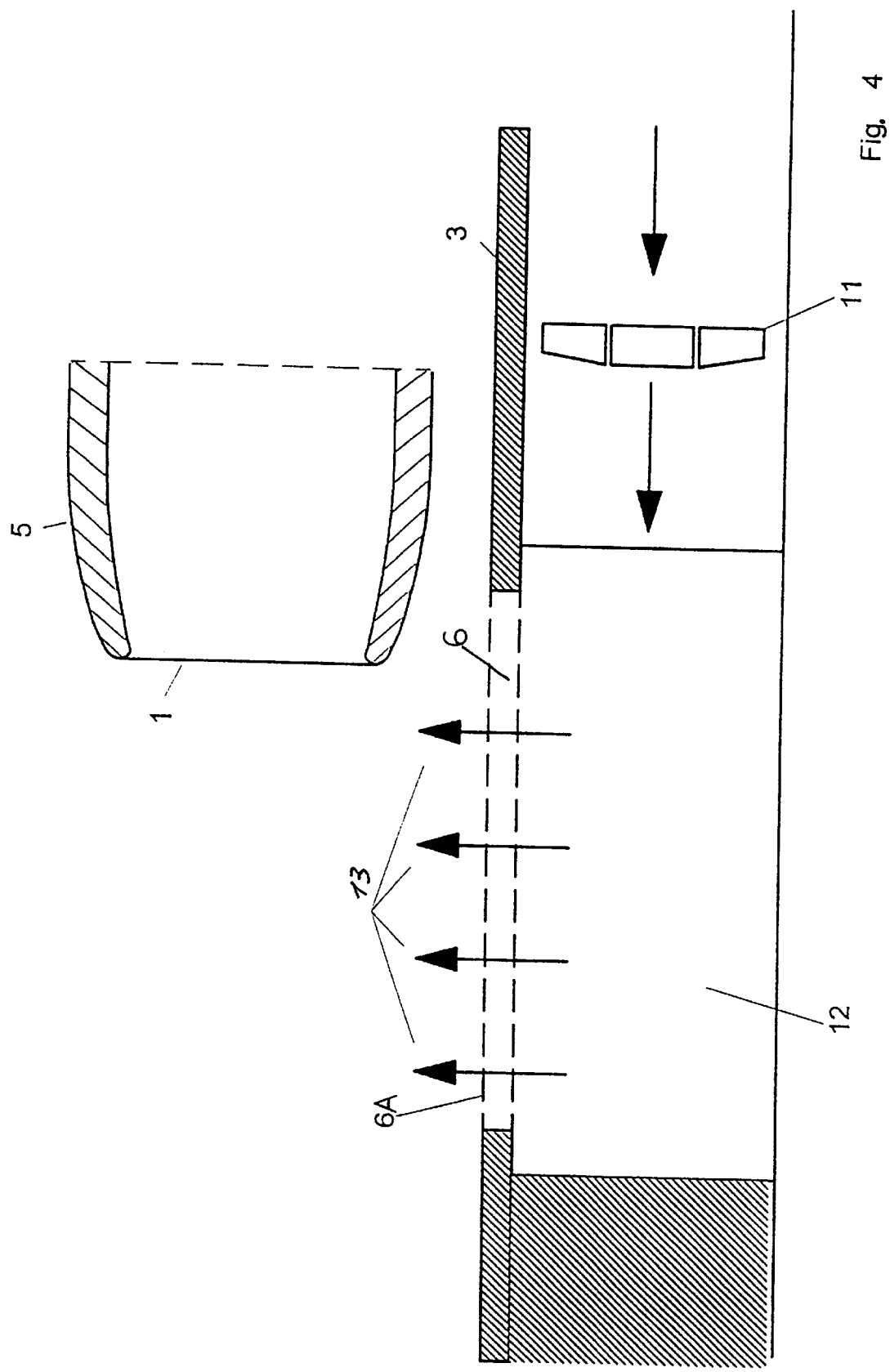
FIG. 4 is a schematic sectional side view of a static test stand arrangement including an air permeable element and with an air chamber provided below the ground.

FIG. 4 schematically illustrates an arrangement comprising a flat planar or surfacial air permeable element 6, that is set into a recess in the ground 3, such that the upper surface of the element 6 is substantially flush with the upper surface of the ground 3. Furthermore, an air chamber, and particularly an air smoothing or settling chamber 12, is formed in the ground 3, and the air permeable element 6 serves as a top cover of this underground chamber 12. The air permeable surface 6A of the air permeable element 6 is located and arranged underneath and axially in front of the air intake 1 of the engine 5. A ventilator 11 also arranged below the ground 3 blows air through the air smoothing or settling chamber 12, and from there through the air permeable element 6, positively into the vortex core of any spiral vortex forming on the air permeable surface 6A. In this manner, the after-flow of air into any arising vortex core is positively ensured and reinforced. The generation of fully formed vortices extending between the ground 3 and the air intake 1 is thereby prevented.

In all of the above described embodiments, in order to achieve an optimal balance between the air flow volume, air pressure, and air flow velocity into the vortex cores, the air permeability of the air permeable surface 6A of the air permeable element 6 is in the range of 20% to 50%. The air permeable surface 6A of the element 6 having such a permeability can be embodied as a screen, grid or grating, or as a perforated air spreader plate or the like. A person skilled in the art will readily be able to provide many different configurations and embodiments of air permeable elements having the required degree of air permeability through the surface 6A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of stabilizing an air flow into an air intake of a turbine engine operating near the ground, comprising the following steps:

operating said turbine engine near the ground, and preventing at least the complete formation of a spiral vortex extending between the ground and said air intake of said turbine engine;

wherein said step of preventing at least the complete formation of a spiral vortex comprises providing a structural member between said air intake and the ground, initiating a spiral vortex having a vortex core on said structural member, and flowing air into said vortex core of said spiral vortex through said structural member so as to prevent a further development of said spiral vortex and to prevent said spiral vortex from extending to said air intake.

2. The method according to claim 1, further comprising a preliminary step of mounting said turbine engine on a stationary test stand, and wherein said step of operating said turbine engine comprises conducting a static operating test of said turbine engine.

3. The method according to claim 1, wherein said step of flowing air into said vortex core destroys said initiated spiral vortex.

4. The method according to claim 1, wherein said step of flowing air comprises passively flowing air through said structural member responsive to a reduced pressure in said vortex core.

5. The method according to claim 1, wherein said step of flowing air comprises actively and positively blowing air through said structural member using a powered ventilator.

6. The method according to claim 5, wherein said step of flowing air further comprises controlling said ventilator so that said air being blown through said structural member has a proper pressure, a proper flow volume and a proper flow velocity to ensure that said initiated spiral vortex is destroyed before developing further to reach said air intake.

7. The method according to claim 1, carried out so as to achieve a rotationally symmetric air flow into said air intake uniformly over a cross-sectional area of said air intake.

8. A system for stabilizing an air flow into an air intake of a turbine engine operating near the ground, comprising:

a turbine engine including an air intake, an engine support supporting said engine relative to the ground, and an air permeable structural element arranged between the ground and said air intake and extending in front of said air intake, wherein said structural element has such an air permeability and is arranged in such a manner that air will flow through said structural element into a vortex core of a spiral vortex forming on said structural element when said engine is operated, wherein said air permeable structural element has a relatively thin, surfacially extending cylindrically curved half-cylindrical shell configuration, and wherein said structural element is arranged such that said half-cylindrical shell configuration partially surrounds said turbine engine and extends across a plane of said air intake extending perpendicularly to a rotation axis of said turbine engine.

9. The system according to claim 8, wherein said engine support comprises a stationary engine static testing stand.

10. The system according to claim 8, wherein said air permeable structural element extends parallel to said rotation axis of said turbine engine over an area displaced in front of said air intake in a direction away from said turbine engine.

11. The system according to claim 8, wherein said system does not include a powered ventilator arranged to provide said air flowing through said air permeable structural element.

12. The system according to claim 8, wherein said air permeability of said air permeable structural element is in a range from 20% to 50%.

13. A system for stabilizing an air flow into an air intake of a turbine engine operating near the ground, comprising:

a turbine engine including an air intake, an engine support supporting said engine relative to the ground, an air permeable structural element arranged between the ground and said air intake and extending in front of said air intake, wherein said structural element has such an air permeability and is arranged in such a manner that air will flow through said structural element into a vortex core of a spiral vortex forming on said structural element when said engine is operated, an air chamber arranged between said air permeable structural element and the ground and communicating with said air permeable structural element, and a powered ventilator connected to said air chamber and adapted to positively blow air into said air chamber to provide said air flowing through said air permeable structural element.

14. The system according to claim 13, wherein said air chamber comprises side walls, and a top opening of said chamber is covered by said air permeable structural element and a bottom opening of said chamber is covered by the ground.

15. The system according to claim 13, wherein said air permeable structural element has a relatively thin, surfacially extending flat planar configuration.

16. A system for stabilizing an air flow into an air intake of a turbine engine operating near the ground, comprising:

a turbine engine including an air intake, an engine support supporting said engine relative to the ground, an air permeable structural element arranged between the ground and said air intake and extending in front of said air intake, wherein said air permeable structural element has such an air permeability and is arranged in such a manner that air will flow through said structural element into a vortex core of a spiral vortex forming on said structural element when said engine is operated, and wherein said air permeable structural element is at least partially set into a recess in the ground, an air smoothing chamber set into the ground directly beneath said air permeable structural element, and a powered ventilator that is arranged below a top surface of the ground, connected to said air smoothing chamber, and adapted to blow air into said air smoothing chamber to provide said air flowing through said air permeable structural element from said air smoothing chamber.

17. The system according to claim 16, wherein a top surface of said air permeable structural element is substantially flush with the top surface of the ground.

* * * * *